(12) United States Patent
Nguyen et al.

(10) Patent No.: US 7,698,136 B1
(45) Date of Patent: Apr. 13, 2010

(54) METHODS AND APPARATUS FOR FLEXIBLE SPEECH RECOGNITION

(75) Inventors: Patrick T. M. Nguyen, Alameda, CA (US); Adeeb W. M. Shana'a, Alameda, CA (US); Amit V. Desai, Alameda, CA (US)

(73) Assignee: Voxify, Inc., Alameda, CA (US)

( * ) Notice: Subject to any disclaimer, the term of this patent is extended or adjusted under 35 U.S.C. 154(b) by 1085 days.

(21) Appl. No.: 10/353,571

(22) Filed: Jan. 28, 2003

(51) Int. Cl.
*G10L 15/12* (2006.01)

(52) U.S. Cl. .................... 704/241; 704/240; 704/256.5; 704/256; 704/257; 704/231

(58) Field of Classification Search .............. 704/256.5, 704/256, 257, 241, 231, 240
See application file for complete search history.

(56) References Cited

U.S. PATENT DOCUMENTS

| | | | | |
|---|---|---|---|---|
| 4,896,358 A | * | 1/1990 | Bahler et al. ................. | 704/257 |
| 5,218,668 A | * | 6/1993 | Higgins et al. ............... | 704/200 |
| 5,509,104 A | * | 4/1996 | Lee et al. ..................... | 704/256 |
| 5,649,057 A | * | 7/1997 | Lee et al. ..................... | 704/256 |
| 5,797,123 A | * | 8/1998 | Chou et al. .............. | 704/256.5 |
| 6,023,676 A | * | 2/2000 | Erell ........................... | 704/241 |
| 6,138,098 A | * | 10/2000 | Shieber et al. ............... | 704/257 |
| 6,594,630 B1 | * | 7/2003 | Zlokarnik et al. ........ | 704/256.5 |
| 7,085,716 B1 | * | 8/2006 | Even et al. .................... | 704/235 |
| 7,177,817 B1 | * | 2/2007 | Khosla et al. ............... | 704/275 |
| 2002/0032564 A1 | * | 3/2002 | Ehsani et al. ................ | 704/235 |
| 2002/0128821 A1 | * | 9/2002 | Ehsani et al. ................. | 704/10 |
| 2002/0193997 A1 | * | 12/2002 | Fitzpatrick et al. .......... | 704/270 |
| 2003/0023437 A1 | * | 1/2003 | Fung .......................... | 704/236 |

OTHER PUBLICATIONS

Rahim et al., "Discriminative Utterance Verification Using Minimum String Verification Error (MSVE) Training", Proceedings of IEEE-ICASSP, 1996, pp. 3585-3588.*

* cited by examiner

*Primary Examiner*—Vijay B Chawan
(74) *Attorney, Agent, or Firm*—Orrick, Herrington & Sutcliffe LLP

(57) ABSTRACT

The present invention is directed to a computer implemented method and apparatus for flexibly recognizing meaningful data items within an arbitrary user utterance. According to one example embodiment of the invention, a set of one or more key phrases and a set of one or more filler phrases are defined, probabilities are assigned to the key phrases and/or the filler phrases, and the user utterances is evaluated against the set of key phrases and the set of filler phrases using the probabilities.

34 Claims, 11 Drawing Sheets

600  S  ⟶ PRE-FILLER DATA POST-FILLER prob =1.0

601  PRE-FILLER ⟶ ANY1                 prob = p1
                  <empty>                   = 1 − p1

602  DATA  ⟶ <item 1>
           ⟶ <item 2>
           ⟶ <item 3>
              .....

603  POST-FILLER ⟶ ANY2                prob = p2
                   <empty>                  = 1 − p2

FIG. 6

| DATA | ⟶ | "Chris Brooks" | prob = 0.05 | employee id = 1 |
|---|---|---|---|---|
| | ⟶ | "Christopher Brooks" | = 0.05 | = 1 |
| | ⟶ | "Michael Smith" | = 0.05 | = 2 |
| | ⟶ | "Mike Smith" | = 0.05 | = 2 |
| | ⟶ | "Helen Stokes" | = 0.10 | = 3 |

| | | | |
|---|---|---|---|
| 900 | PRE-FILLER | → ANY1 | prob = p1 |
| | | → <empty> | = 1 − p1 |

| | | | |
|---|---|---|---|
| 901 | ANY1 | → FILLERWORD ANY1 | prob = p1 |
| | | → FILLERWORD | = 1 − p1 |

| | | | |
|---|---|---|---|
| 902 | FILLERWORD | → <word 1> | |
| | | → <word 2> | |
| | | → <word 3> | |
| | | ..... | |
| | | → <word N> | |

| | | | |
|---|---|---|---|
| 903 | POST-FILLER | → ANY2 | prob = p2 |
| | | → <empty> | = 1 − p2 |

| | | | |
|---|---|---|---|
| 904 | ANY2 | → FILLERWORD ANY2 | prob = p2 |
| | | → FILLERWORD | = 1 − p2 |

FIG. 9

| | | | |
|---|---|---|---|
| 1100 | S | → PRE-FILLER DATA POST-FILLER | prob =1.0 |

| | | | |
|---|---|---|---|
| 1101 | PRE-FILLER | → ANY1 | prob = p1 |
| | | PRE_DATA | = (1 − p1)(p3) |
| | | <empty> | = (1 − p1)(1 − p3) |

| | | | |
|---|---|---|---|
| 1102 | ANY1 | → FILLERWORD ANY1 | prob = p1 |
| | | → FILLERWORD PRE_DATA | = (1 − p1)(p3) |
| | | → FILLERWORD | = (1 − p1)(1 − p3) |

| | | |
|---|---|---|
| 1103 | DATA | → <item 1> |
| | | → <item 2> |
| | | → <item 3> |
| | | ..... |

| | | | |
|---|---|---|---|
| 1104 | POST-FILLER | → POST_DATA | prob = (p4)(1 − p2) |
| | | POST_DATA ANY2 | = (p4)(p2) |
| | | ANY2 | = (1 − p4) (p2) |
| | | <empty> | = (1 − p4)(1 − p2) |

FIG. 11

| | | | | |
|---|---|---|---|---|
| 1200 | S | → | PRE-FILLER DATA POST-FILLER | prob =1.0 |
| 1201 | PRE-FILLER | → | ANY1 <br> PRE_DATA <br> <empty> | prob = p1 <br> = (1 – p1)(p3) <br> = (1 – p1)(1 – p3) |
| 1202 | ANY1 | → <br> → <br> → | FILLERWORD ANY1 <br> FILLERWORD PRE_DATA <br> FILLERWORD | prob = p1 <br> = (1 – p1)(p3) <br> = (1 – p1)(1 – p3) |
| 1203 | FILLERWORD | → <br> → | REGULAR <br> CONFUSION | prob = 1 – p5 <br> = p5 |
| 1204 | CONFUSION | → <br> → <br> → | <confusion word 1> <br> <confusion word 2> <br> <confusion word 3> <br> ..... | |
| 1205 | POST-FILLER | → <br> → <br> → <br> → | POST_DATA <br> POST_DATA ANY2 <br> ANY2 <br> <empty> | prob = (p4)(1 – p2) <br> = (p4)(p2) <br> = (1 – p4)(p2) <br> = (1 – p4)(1 – p2) |

FIG. 12

METHODS AND APPARATUS FOR FLEXIBLE SPEECH RECOGNITION

FIELD OF THE INVENTION

The present invention relates to speech recognition systems and, more particularly, to a system and method for recognizing desired data items within an arbitrary user utterance.

BACKGROUND

The use of speech recognition in computer-based interactive applications has become more and more commonplace in everyday life. Today, a computer-based voice application can allow a telephone caller to direct the application to perform simple tasks through spoken utterances, such as connecting the caller with people in a telephone directory or retrieving airline flight information. Many companies have sought to expand or improve their customer service functions by using technology such as speech recognition to automate tasks that have traditionally been handled by human agents.

Conventional voice applications are well understood in the art, as disclosed for example in U.S. Pat. Nos. 6,173,266 issued to Marx et al. and 6,314,402 issued to Monaco et al., both of which are incorporated herein by reference. PRIOR ART FIG. 1 shows the call flow (100) of an example voice activated phone attendant application that can be used by a company to direct incoming phone calls. When a user calls the company, the application receives the call and outputs a greeting message, such as "Welcome to Company A" (110). The application then prompts the user to provide information (120) by listing options available to the user or by instructing the user on how to respond to the application, for example by providing the prompt: "If you know the name of the person you wish to speak to, please say the first name followed by the last name now. If you would like to speak to an operator, please say 'Operator' now."

Next, the application waits for a response from the user (130) and then processes the response (140). For example, if the user says "Chris Brooks" the application needs to recognize this user utterance and determine if there is a Chris Brooks to whom the call should be transferred. A robust application should be designed to also recognize common variations of names, such as "Christopher Brooks." If the application finds a match to the user utterance, the application prompts the user for confirmation by providing output such as: "Do you mean 'Chris Brooks'?" (150). The application waits to receive a confirmation response from the caller (160), processes the response (170), and then acts upon the processed response (180), such as by transferring the call to the designated recipient and informing the caller of this action.

PRIOR ART FIG. 2 shows a flowchart (200) that provides more detail in the processing of a user utterance, such as in step 140 of the example voice application of FIG. 1. First, the audio waveform of the user utterance is recorded (210), and a phonetic representation of the waveform is created (220). Next, the phonetic representation of the utterance is compared to entries in a database of vocabulary words or phrases recognized by the application to generate a hypothesis of what the user said and a confidence level that the hypothesis is correct (230). In this example, the hypothesis is categorized as a high confidence hypothesis (240), a low confidence hypothesis (250), or a null hypothesis (260). Depending on whether a hypothesis is generated and the level of confidence, the application can reprompt the user (270), ask the user to confirm the hypothesis (150), or proceed directly to take appropriate action (180). For example, if the processing of the user utterance leads to a high confidence hypothesis (240), the example phone attendant application can directly transfer the caller to the requested recipient (180) and omit the confirmation and related steps (150, 160, 170).

Because people communicate naturally via speech, speech recognition systems have become viewed as a promising method for automating service functions without requiring extensive changes in user behavior. To achieve this vision, speech recognition systems should allow a user to ask for and provide information using natural, conversational spoken input. Recent advances in certain areas of speech recognition technology have helped alleviate some of the traditional obstacles to usable speech recognition systems. For example, technology advances have enabled unrehearsed spoken input to be decoded under a wider range of realistic operating conditions, such as background noise and imperfect telephone line quality. Additionally, recent advances have allowed voice applications to recognize voice inputs from a broader population of users with different accents and speaking styles.

However, despite such recent advances, conventional speech recognition systems have not provided adequately natural and conversational speech interfaces for users, and therefore the effectiveness of such systems, and the perception of and willingness to adopt such systems by users, has been severely limited.

In particular, understanding arbitrary speech from a human user has been a difficult problem. The acoustic signals related to common speech contain an overlap of phonetic information that cannot be decoded perfectly without knowledge of the context of the conversation, and in turn, knowledge of the real world. Therefore, computer-based speech recognition provides probabilistic results, relying on data-driven statistical approaches to determine a hypothesis (or small set of hypotheses) that has the highest posterior probability for matching the input audio signal. A description of the current state-of-the-art in speech recognition systems may be found in X. Huang, A. Acero, H. Hon, *Spoken Language Processing*, Prentice Hall, New Jersey, 2001, and M. Padmananbhan, M. Picheny, "Large-Vocabulary Speech Recognition Algorithms", IEEE Computer, April 2002.

To maintain high levels of recognition accuracy, the user's input must typically be constrained by limiting both the vocabulary of allowed words and the way in which sentences can be formed. These constraints are expressed by a grammar, a set of rules that defines valid sentences as a structured sequence of words and phrases. For example, to recognize user responses to the question "Tell me the name of the person you'd like to call" (for a sample voice activated phone attendant application), the application developer might define the following variations:

[Name]
I want to talk to [Name]
I want to call [Name]
I want to speak with [Name]
I'd like to get [Name] please The difficulty with the above practice is that if the user makes a response that is not exactly matched by one of the predefined rules (e.g. "Can you get me John Smith if he's in the office?"), the application will not recognize it (an out-of-grammar condition), and will have to reprompt the user, who may not understand why his or her response was not recognized. The out-of-grammar rates can be quite high unless the application developer is knowledgeable enough to predefine all the common linguistic variations that might be uttered by a user.

Alternatively, the prompt must be very detailed to guide and restrict the user response, e.g. "If you know the name of the person you wish to speak to, please say only the first name followed by the last name now. If you would like to speak to an operator, please say 'Operator' now". This technique is awkward, lengthy, and sounds un-natural to most callers. Moreover, a user's response can still be highly variable and hard to predict, and can contain disfluencies such as re-starts and pauses (uhm and uh). Despite these limitations, the use of grammars is common in current voice applications, and most developers are familiar with grammars and able to write and understand grammars of reasonable complexity.

One alternative approach to using pre-defined grammars in handling variations in user responses is an n-gram language model. An n-gram model does not rely on predefining all valid sentences; instead, an n-gram model contains information on which words are more likely to follow a given sequence of (n−1) words. An n-gram model does not enforce a sentence structure, and can assign a probability to a sentence even if it is ungrammatical or meaningless in normal usage. If the probability of a word depends only on the immediately preceding word, the model is known as a bigram. If the probability of a word depends on the previous two words, the model is known as a trigram. An n-gram language model is usually derived by counting word sequence frequencies from a training corpus—a large set of training texts that share the same language characteristics as the expected input. For example, a bigram model for a flight reservation application might specify that the word "to" has a much higher probability of following the word "fly" than the word "will", since a sample of user utterances in this context would have a higher frequency of the word sequence "fly to" than the word sequence "fly will". With a sufficient training set size, n-gram models can be built to recognize free-style speech.

However, there are several disadvantages to using n-gram models. First, n-gram models are not as familiar as grammars to most current voice application developers, and cannot be represented in as concise a human-readable form as grammars. Second, n-gram models need to be trained by a large number of samples (many tens of thousands—or up to millions) to achieve adequate levels of accuracy. This training requirement significantly limits the speed in which these systems can be deployed. Furthermore, typically the training samples must be obtained by collecting utterances from an already deployed speech recognition system. Therefore, n-gram models cannot be easily used in building a new voice application that does not have a detailed record of user utterances.

There is a need for a system and method that overcomes the above problems, as well as providing additional benefits.

SUMMARY OF THE INVENTION

The present invention relates to speech recognition systems and, more particularly, to a system and method for recognizing desired data items within a user utterance. In one embodiment, a method for flexibly recognizing user utterances comprises defining a set of one or more key phrases, defining a set of one or more filler phrases, assigning probabilities to the key phrases and to the filler phrases, and evaluating the user utterance against the set of key phrases and the set of filler phrases using the probabilities.

BRIEF DESCRIPTION OF THE DRAWINGS

PRIOR ART

PRIOR ART

FIG. 6 depicts a probabilistic context-free grammar according to one embodiment of the present invention.

FIG. 7 depicts a sample context-free grammar for the meaningful data values defined by an application developer consistent with an embodiment of the present invention.

FIG. 9 depicts a probabilistic context-free grammar for matching filler phrases according to one embodiment of the present invention.

FIG. 11 depicts a probabilistic context-free grammar with trigger grammars according to one embodiment of the present invention.

FIG. 12 depicts a probabilistic context-free grammar with trigger grammars and confusion grammars according to one embodiment of the present invention.

DETAILED DESCRIPTION

Overview

The following detailed description of the invention refers to the accompanying drawings. The detailed description does not limit the invention. Instead, the scope of the invention is defined by the appended claims and equivalents. The present invention is directed, in part, to solving limitations on the recognition of user speech by providing a system and method for defining a grammar that can handle arbitrary user speech with good levels of accuracy. The present invention includes methods and apparatus for recognizing user utterances. The present invention also includes grammars used in recognizing user utterances.

A. Overall Architecture

Figure 1:
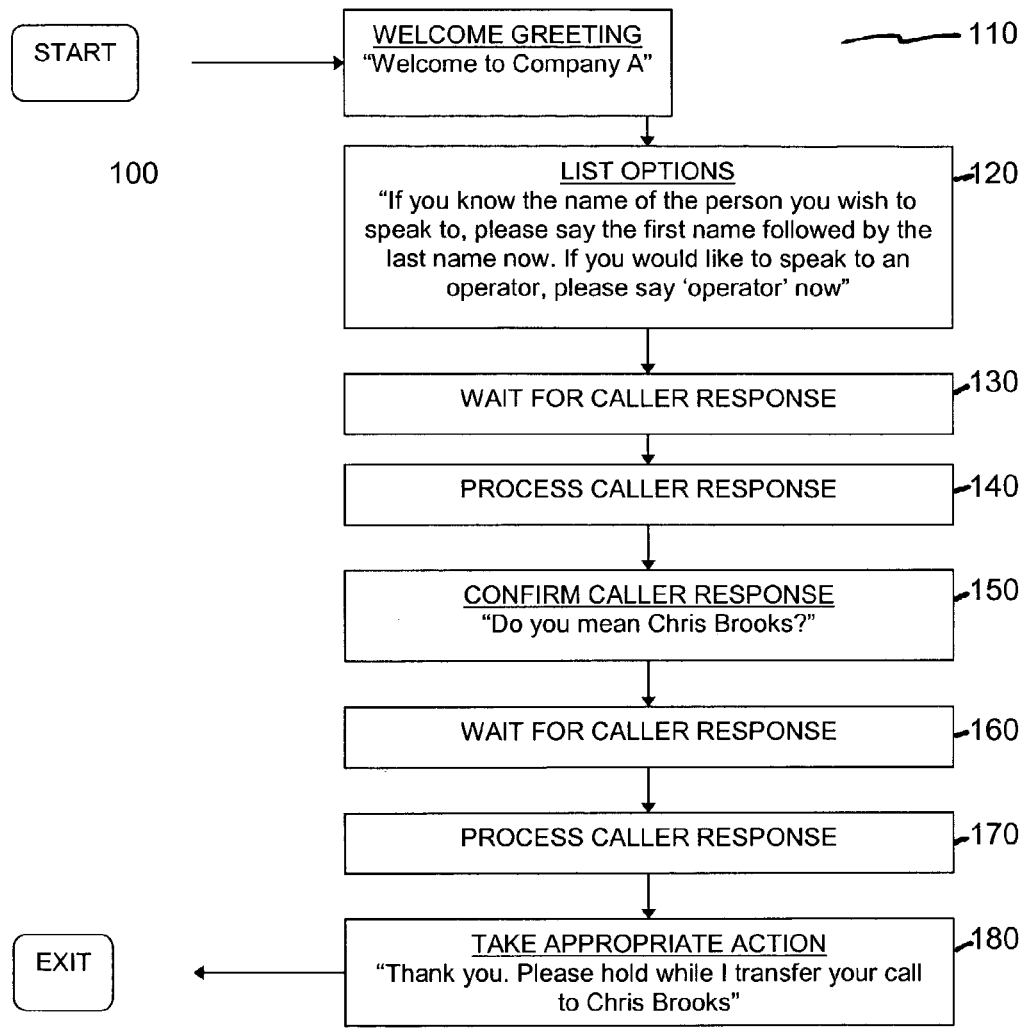
FIG. 1 is a flow chart of the call flow of a speech recognition application.
Figure 2:
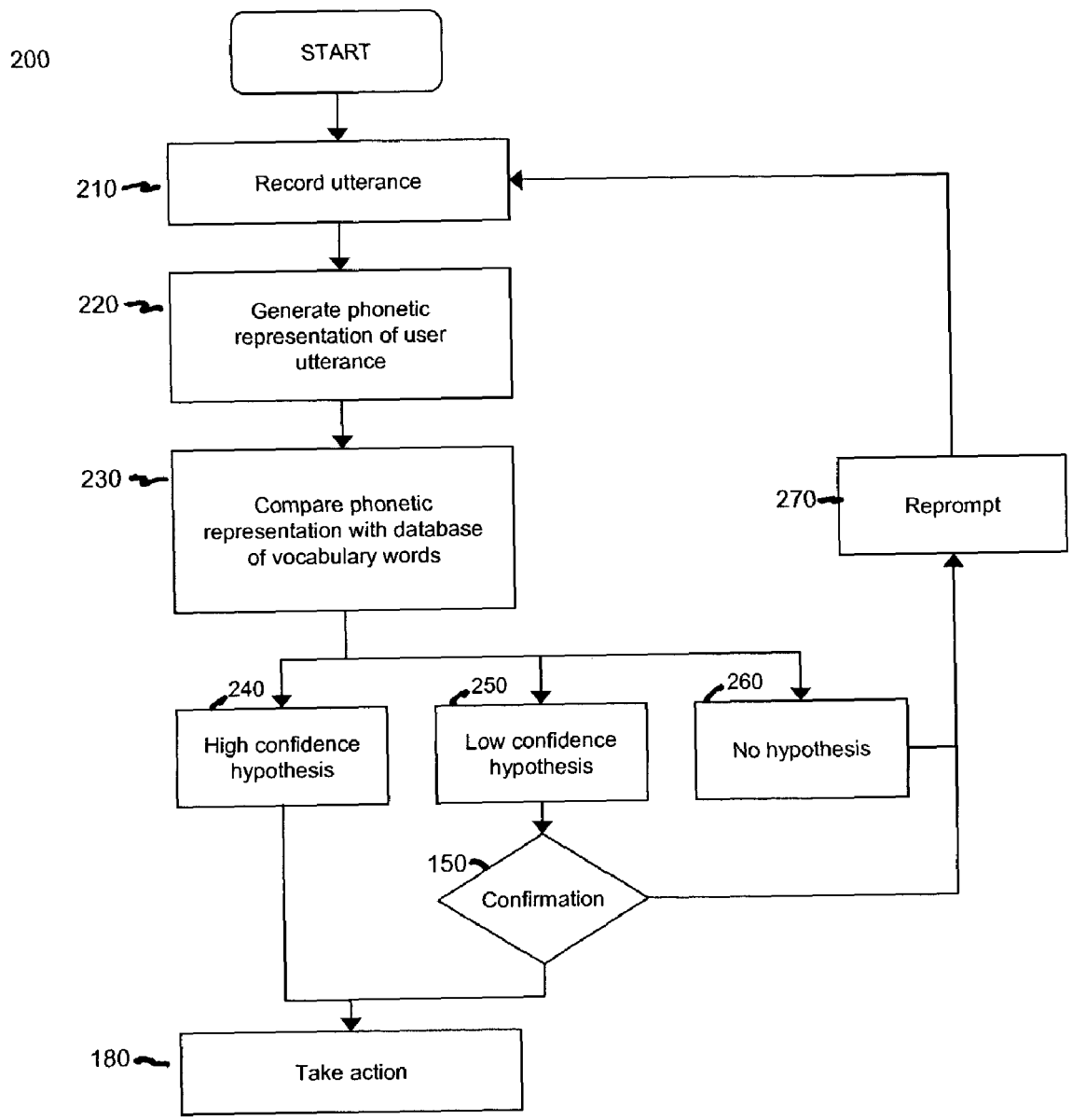
FIG. 2 is a flow chart of a processing step in a speech recognition application.
Figure 3:
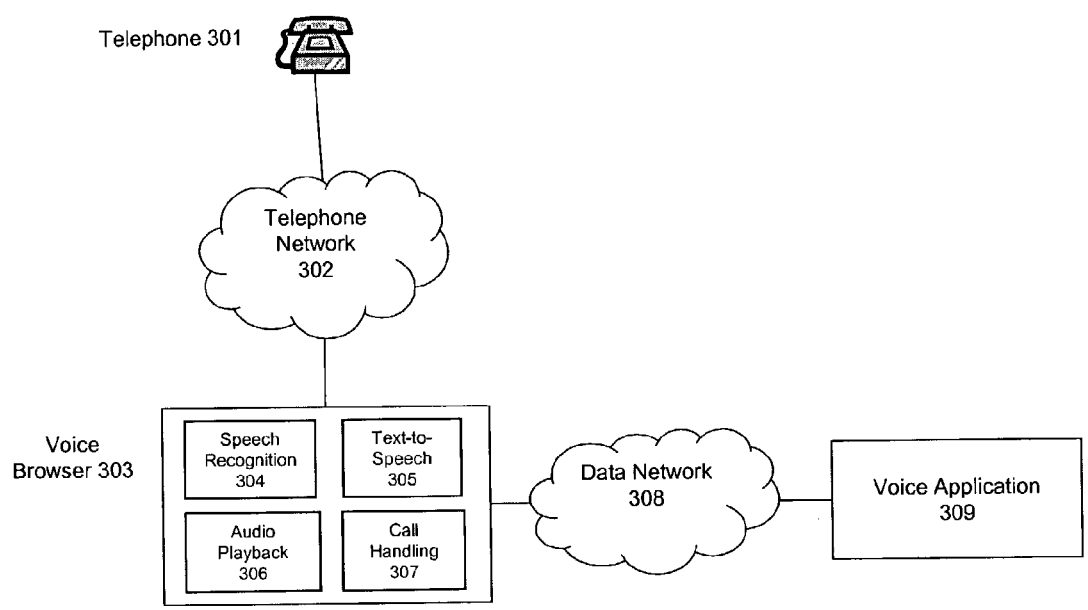
FIG. 3 is a diagram illustrating an environment within which the invention may be implemented.

FIG. 3 illustrates generally a voice application architecture in which the present invention can be implemented. Such a system may include a telephone 301, which is connected by a telephone network 302 to a voice browser 303. The voice browser includes the hardware and software to conduct bi-directional audio communications with the caller through the telephone network. The voice browser may execute a program expressed in a voice language, such as a markup language like VoiceXML or Speech Application Language Tags (SALT), that is transmitted in the form of documents over a data network 308 (such as the Internet) from a voice application 309. The voice browser may include a speech recognition engine 304, a text-to-speech synthesizer 305, a player for audibly rendering files recorded using generally available audio formats 306, and a component for handling calls over the telephone network 307, each of which may be of a kind available commercially and well understood by those of ordinary skill in the art of building voice applications. In one embodiment of the present invention, the voice browser is responsible for detecting an incoming call, answering the call, requesting the initial voice document from the voice application, interpreting the document and executing its instructions according to the rules of the applicable voice language. These instructions may include the outputting of prompts to the user (messages that may be prerecorded or rendered by the text-to-speech synthesizer), and the processing of responses from the user using specified grammars. The voice browser can then generate actions in response to user events (such as spoken input or call disconnection) or system events (such as subsystem exceptions), actions that may be defined in the current document, or in another document that is to be fetched from the voice application.

The voice browser 303 and voice application 309 may reside on computer systems of the kind well understood by those of ordinary skill in the art, and therefore the underlying details of the voice browser 303, voice application 309 and computer systems on which they may reside are not described in further detail here.

Figure 4:
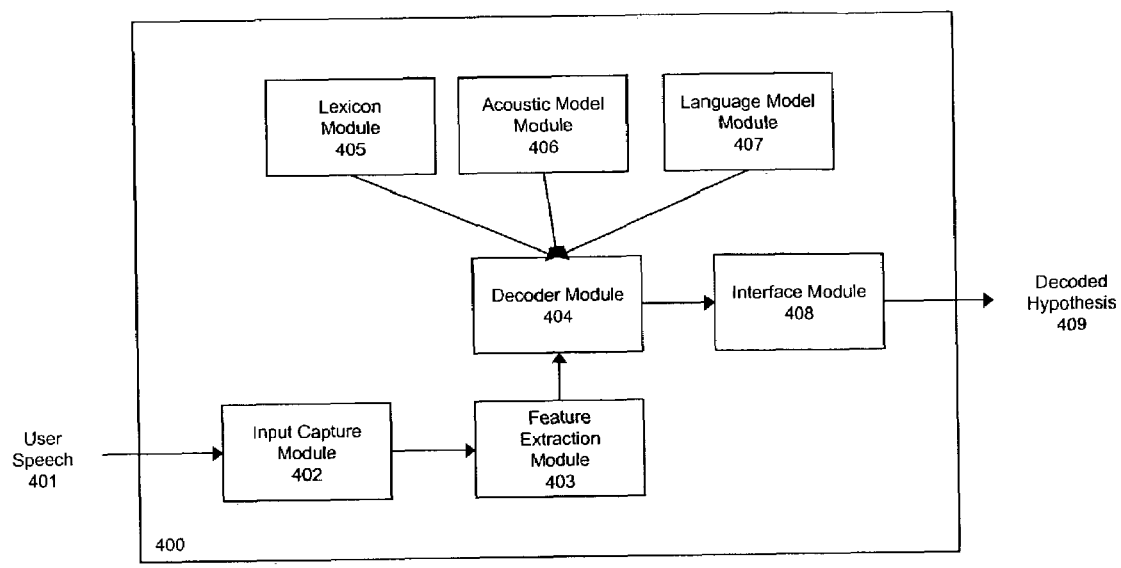
FIG. 4 is a simplified block illustrating a speech recognition system consistent with one embodiment of the invention.

FIG. 4 illustrates one embodiment of a speech recognition system 400 for processing and interpreting a user's input consistent with the present invention. The modules in system 400 may, for example, be implemented by a combination of the voice browser 303 and voice application, 309. The system 400 includes an input capture module 402, a feature extraction module 403, a lexicon module 405, an acoustic model module 406, a language model module 407, a decoder module 404, and an interface module 408. Use of the modules 402-408 within the system 400 are for exemplary purposes and are not intended to limit the scope of the invention. In one embodiment, the input capture module 402 captures an input speech signal 401, which may be received over a microphone, transmitted over a telephone line or other voice network, or by other means. In one embodiment, this speech signal 401 is sampled, filtered, and processed in feature extraction module 403 to extract a multidimensional feature vector for each frame of the input signal. In a preferred embodiment, this procedure is modeled on the workings of the human auditory system, and the feature vectors are intended to provide clues about the phonemes that produced them. A phoneme is a basic sound in a language, such that the pronunciation of each word in the language can be represented as a linear sequence of phonemes. The precise steps to obtain the acoustic feature vectors from the speech signal are known to those skilled in the art of digital signal processing and speech recognition and thus need not be described in further detail.

Further details are provided relating to a preferred embodiment consistent with the present invention. In this embodiment, decoder module 404 is used to uncover a hypothesized word sequence 409 that best fits the input speech signal 401. The decoder module 404 uses input from a lexicon module 405, an acoustic model module 406, and a language model module 407 to find the most probable word sequence 409, given the observed acoustic sequence 401. In mathematical terms, the objective of the decoder 404 is to find:

$$\hat{W} = \arg\max_W P(W|X) \quad (1)$$

Where $W = W_1, W_2, \ldots$ is the word sequence (409) and X is the observed acoustic sequence (401). By applying Bayes' law, the objective can be rewritten as:

$$\hat{W} = \arg\max_W P(X|W)P(W) \quad (2)$$

The decoder module 404 hypothesizes the best word sequence using a number of components. The lexicon module 405 defines the possible words that the search can hypothesize, representing each word as a sequence of phonemes. The acoustic model module 406 models the relationship between the feature vectors and the phonemes. The acoustic model probability $P(X|W)$ is determined by using Hidden Markov Models (HMMs) to compute the likelihood that the sequence of feature vectors extracted from the speech signal by feature extractor module 403 was produced by a given word sequence W. Typically, for a particular recognizer, each word in the recognizer's lexicon has a fixed HMM representation.

The language model module 407 models the linguistic structure of the expected user utterances, and assigns an a-priori probability $P(W)$ to a particular sequence of words W, i.e. the language model 407 assigns an a-priori probability $P(W)$ that a user would utter the particular sequence of words W. Language model module 407 may, for instance, be specified as a grammar, a probabilistic grammar, or an n-gram language model as described further below.

Decoder module 404 assigns a "score" to each hypothesized word sequence W (409) by multiplying the acoustic model probability $P(X|W)$ and the language model probability $P(W)$. A hypothesis with a high score is a more likely match for the input speech signal 401 than a hypothesis with a low score. In one embodiment of the present invention, as long as the score for the hypothesis with the highest score is above a predefined threshold, decoder module 404 returns a decoded result 409 via interface module 408. Otherwise, the decoder signals an "out-of-grammar" condition indicating that the speech input signal 401 did not result in a hypothesis meeting the minimum threshold score.

Those skilled in the art will appreciate that the foregoing description of a speech recognition system (including the description of subsystems as logically separate parts and an acoustic model probability and language model probability) is for illustrative purposes only, and that any or all of the foregoing steps or subsystems may be combined. Similarly, those skilled in the art will recognize that the invention is not limited in its application to the details set forth in this description, and is capable of other embodiments and of being practiced and carried out in various ways. For example, decoder module 404 may return multiple decoded hypotheses 409, which may be ranked and which may undergo further evaluation and processing, and the thresholds for determining which (and/or how many hypotheses) are returned may be set by a user, the application developer, or by any other means. Further details regarding the language model module 407 according to the present invention and its operation are now described.

B. Context Free Grammars

Figure 5:
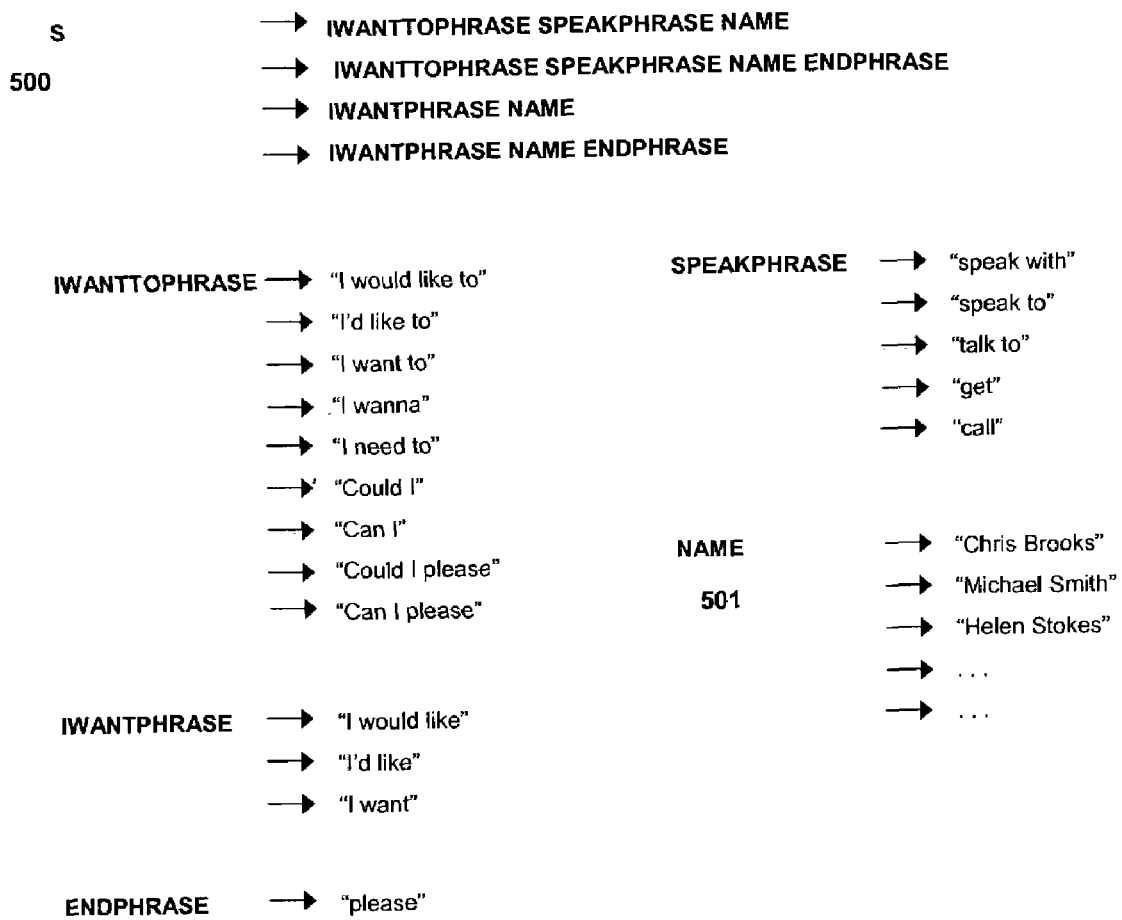
FIG. 5 depicts the structure of a sample context-free grammar.

For the purposes of this description, a "grammar" is a formal specification of the permissible structures of a language model. A context free grammar (CFG) is a common grammar form that is familiar to those skilled in the art of writing voice applications. A CFG is a set of rules that defines valid sentences as a structured sequence of words and phrases. Stated another way, a CFG may be thought of as a set of production rules; these production rules allow a developer or writer of a CFG to specify the valid permutations of words and phrases that may be uttered by a user and recognized using the grammar. Production rules may be comprised of terminal elements (typically words in the lexicon) and non-terminal elements (including other grammars, which may be referred to as subgrammars). In a CFG, these rules define every non-terminal as a sequence of non-terminals and terminals. FIG. 5 illustrates a simple CFG 500 that might be used in a voice activated phone attendant application. The phone attendant application allows incoming telephone callers to be connected to a person listed in an associated directory by uttering a voice request that includes the person's name 501. The production rules associated with CFG 500 allow a user to utter a number of variations that result in a connection to the target call recipient designated [NAME], including utterances such as "I want to talk to [NAME]", "I'd like to speak with [NAME]" and "Can I get [NAME] please".

A CFG is a strict grammar in that the grammar generally recognizes only those user utterances covered by the production rules. When using a non-probabilistic grammar, and with reference to equation (2) above, a decoder generally assigns a probability to P(W) of 1 if the word sequence is defined by the production rules, or 0 if the word sequence is not defined by the production rules. A probability of P(W)=1 corresponds to a word sequence that is allowed (i.e. can be parsed by the production rules specified by the application developer), whereas a probability of P(W)=0 corresponds to a word sequence that is not allowed. Therefore, the speech recognition system is not designed to return word sequences that are not specified by a production rule as hypothesized user statements. Moreover, the language model 407 in a non-probabilistic grammar distinguishes between allowed [P(W)=1] and not allowed [P(W)=0] word sequences, but does not differentiate between alternative allowed word sequences [P(W)=1 for each allowed sequence]. Therefore, in a non-probabilistic grammar, when there are multiple allowed word sequences, the hypotheses 407 generated by the decoder module 404 depends on the acoustic model module 406, which provides P(X|W) in equation (2) above.

In a probabilistic CFG, a probability may be specified for each production rule. If a non-terminal can be expanded by multiple production rules, the probability assigned to one of these production rules represents its weight relative to the other production rules for the same non-terminal. For each non-terminal, the sum of the probabilities for its production rules sum to 1. Assuming independence of rule usage, the probability for a word sequence P(W) is the product of the probabilities of its constituent production rules. This allows the language model module 407 to influence the decoded hypothesis 409 even as between multiple allowed word sequences. For example, a probabilistic CFG for the phone attendant application may declare that the trailing word "please" has less than a 50% probability of occurrence. Preferably, the probabilities are assigned depending on the likelihood that a user utterance will correspond to the production rule. These probabilities may be derived in a number of ways, such as statistical analyses of a sample utterance set or knowledge-based assumptions. According to an aspect of the present invention, these probabilities may be derived and/or adjusted based on implicit or explicit user feedback from operating the speech recognition system. For example, according to one embodiment of the present invention, an initial set of probabilities may be assigned based on initial estimates or analyses of user utterances, and the probabilities may be adjusted as a voice application is used by taking into account direct feedback from users of the system (such as via explicit user confirmations that a hypothesis 409 generated by the application is correct or incorrect), by indirect feedback from users of the system (such as passive confirmations by the user of a recognition hypothesis 409), or from information generated from the voice application itself (such as statistics regarding whether hypotheses 409 were accepted by users, based on factors such as call length, user interactions with the voice application, etc.)

C. Flexible Context Free Grammars

Techniques for implementing a probabilistic CFG that can flexibly accept and interpret user utterances will now be described in more detail. For purposes of explanation, numerous specific details are set forth to provide a thorough understanding of the present invention. It will be apparent, however, to one skilled in the art that the present invention may be practiced without these specific details, and that the invention is not limited in its application to the details of the method set forth in this description. The invention is capable of other embodiments and of being practiced in other ways.

FIG. 6 shows the basic structure for a probabilistic CFG 600 that can detect a desired data item ("key phrase") from a user utterance, according to one embodiment of the present invention. Grammar DATA 602 is a grammar with production rules that specify the data items, or key phrases, that are to be detected from the user utterance. The extracted data item may correspond to a user command, a user provided data input, etc., and may be passed on to a voice application (309) for further processing. Filler grammar PRE-FILLER 601 is used to match the portions of a user utterance that precede a data item, and filler grammar POST-FILLER 603 is used to match the portions of a user utterance that follow a data item. In one embodiment, the filler phrases from the user utterance that are matched to filler grammars PRE-FILLER 601 and POST-FILLER 603 may be disregarded as not being meaningful data. It will be appreciated that, as used herein, "disregarded" need not mean discarded, as the recognized filler phrases may be retained or used in other ways; but rather that the filler phrases are not used for a particular step in the recognition system.

In a preferred embodiment of the present invention, the filler grammar(s) are constructed to match an arbitrary user utterance in a given language. However, in order for these grammars to be processed by conventional speech recognition engines efficiently (such as for real time applications), these grammars are preferably limited in size, rather than including every possible word in the language. Thus, according to one aspect of the invention, filler grammars utilize the natural acoustic-phonetic similarities between words to derive a limited set of filler words or phrases that can be combined to loosely cover the phonetic spectrum of all the words in a language. It will be appreciated that, as used herein, a "match" need not be an exact match. Instead, a match is an indication of a relatively high degree of similarity, and/or a predetermined (e.g., absolute) degree of similarity. Similarly, it will be appreciated that the use of the term "words" is not limited to actual words in a vocabulary, but may also include phrases, sub-words, phonemes, and the like. One example filler grammar for the English language according to the present invention may be derived using the words shown in the following table:

|  |  | None | Stops p | Nasals m | Fricatives f | Affricates ch | Approximants L |
|---|---|---|---|---|---|---|---|
| Vowel Only | iy | e | pee | me | thee | chee | Lee |
|  | ih |  |  |  |  |  |  |
|  | ey | a | pay | may | thay | che | Lay |
|  | eh |  |  |  |  |  |  |
|  | ae |  | pah |  |  |  |  |

-continued

|  |  | None | Stops p | Nasals m | Fricatives f | Affricates ch | Approximants L |
|---|---|---|---|---|---|---|---|
|  | ay | i | pie | my | thy | chai | Lie |
|  | oy | oy | poi | moy | foy | choi | Loy |
|  | ah | uh |  |  | the |  |  |
|  | uw | oo | dew | knew | shoe | chew |  |
|  | uh |  |  |  |  |  |  |
|  | ow | o | po | moe | foe | cho | Low |
|  | ao | awe | paw | maw | thaw | chaw | Law |
|  | aa | ah | pa | ma | va | cha | La |
|  | aw |  | pow |  | thou | chow |  |
|  | er | or | per |  | fer |  |  |
|  | * | a |  |  | the |  | Le |
| Vowel-Stops | iy p |  | peep |  | seep | cheap | Lepe |
|  | ih p | id | pip | nip | sip | chip | Lip |
|  | ey p | ape |  |  | fade |  |  |
|  | eh p |  | pet | met | said |  | Lep |
|  | ae p | app | pap | nap | sad | chat | Lap |
|  | ay p | i'd | pipe |  | sipe | chide | Lipe |
|  | oy p |  | boyd |  |  |  | Lloyd |
|  | ah p | up | pup |  | sup |  |  |
|  | uw p |  | boot | mood | sud |  | Lupe |
|  | uh p |  | book | nook | shook |  | look |
|  | ow p |  | pope | nope | soap |  | Lope |
|  | ao p | ob |  |  |  |  |  |
|  | aa p | odd | pop | mop | sop | chop | Lop |
|  | aw p |  |  |  |  |  |  |
|  | er p | earp | burp |  |  | chirp |  |
|  | * p |  | but |  |  |  |  |
| Vowel-Nasals | iy m |  |  | mean | seem |  |  |
|  | ih m | in | pim | min | sin |  |  |
|  | ey m | aim | pain | main | same |  | Lame |
|  | eh m | em | pen | men | zen |  |  |
|  | ae m | am | pan | man | fan |  |  |
|  | ay m | i'm |  | mine | fine | chime | Lime |
|  | oy m |  |  |  |  |  | Loin |
|  | ah m | um | pun | nun | fun | chum |  |
|  | uw m | uhm | poon | moon | soon |  | Loom |
|  | uh m |  |  |  |  |  |  |
|  | ow m | ohm | pome | moan | phone |  | Lom |
|  | ao m | awn | pawn |  | fawn |  | Lom |
|  | aa m |  | pom | mom |  |  | Lun |
|  | aw m |  |  |  |  |  |  |
|  | er m | earn | perm |  | fern | churn | Learn |
|  | * m |  |  | mum |  |  |  |
| Vowel-Fricatives | iy f | eath | peeve |  |  |  | Leave |
|  | ih f | if |  | ms | sieve |  |  |
|  | ey f |  | pave | maze | save |  | Lave |
|  | eh f |  | peth | meth | seth |  |  |
|  | ae f |  | path | math |  |  | Laugh |
|  | ay f | ive |  | knife | five | chive | Life |
|  | oy f |  |  |  |  |  |  |
|  | ah f | of | dove | muff |  |  | Love |
|  | uw f |  | poof | news |  |  | Luth |
|  | uh f |  |  |  |  |  |  |
|  | ow f | oaf | dove |  |  |  | Loaf |
|  | ao f |  |  | moth |  |  |  |
|  | aa f |  | poth |  |  |  | Loth |
|  | aw f |  |  |  |  |  |  |
|  | er f |  |  | nerve | surf |  |  |
|  | * f | of |  |  |  |  |  |
| Vowel-Affricates | iy ch | each | peach |  |  |  | Leech |
|  | ih ch | itch | pitch | mitch | fitch |  | Lidge |
|  | ey ch | age | page | mage | sage |  |  |
|  | eh ch | etch | petch |  | fetch |  | Letch |
|  | ae ch |  | patch | match | hatch |  | Latch |
|  | ay ch |  |  |  |  |  |  |
|  | oy ch |  | deutsch |  |  |  |  |
|  | ah ch |  | dutch | nudge | such |  | Lutch |
|  | uw ch |  |  |  |  |  |  |
|  | uh ch |  |  |  |  |  |  |
|  | ow ch |  | poach |  |  |  | Loach |
|  | ao ch |  |  |  |  |  |  |
|  | aa ch |  | botch | notch |  |  | Lodge |
|  | aw ch | ouch | pouch |  |  |  | Louch |
|  | er ch |  | perch | merge | search |  | Lurch |
|  | * ch |  |  |  |  |  |  |

-continued

| | | None | Stops p | Nasals m | Fricatives f | Affricates ch | Approximants L |
|---|---|---|---|---|---|---|---|
| Vowel-Approximants | iy l | eel | peel | kneel | feel | | |
| | ih l | ill | pill | nil | fill | chill | Lil |
| | ey l | ale | pale | male | sale | | Lale |
| | eh l | el | pel | nel | sell | | |
| | ae l | al | pal | mal | sal | | Lal |
| | ay l | i'll | pile | mile | file | | Lile |
| | oy l | oil | boil | noir | soil | | Roil |
| | ah l | ul | dull | null | | | Lull |
| | uw l | | pool | | fool | | Rule |
| | uh l | | | noor | sure | | |
| | ow l | | pole | knoll | sole | | Rol |
| | ao l | all | pall | mall | fall | | Rall |
| | aa l | | doll | moll | fall | | Loll |
| | aw l | owl | | | fowl | | |
| | er l | | | | | | |
| | * l | | | | | | |

In this example filler grammar, 39 of the most common phonemes in the English language are divided into consonants and vowels, with the consonants grouped into 5 sets while the 16 vowels are each assigned to their own set. The consonants and vowels are combined into a small number of linear sequences, such as vowel only, consonant-vowel, vowel-consonant, consonant-vowel-consonant. Words can then be selected for each combination that have the corresponding phonemic representation and are also present in the lexicon of the speech engine used. Consistent with the present invention, an arbitrary user utterance may then be matched to a filler grammar as long as the phonetic representation of the user's speech signal is close enough to any sequence of the filler words so that the resulting decoded hypothesis has a score that meets the speech engine's predefined threshold. Preferably, a filler grammar will usually be generic enough that it can be reused in all applications within a particular class of applications.

According to one preferred embodiment of the invention, an application developer using a flexible recognition CFG such as that disclosed in FIG. 6 would only need to specify the DATA grammar for the key phrases to be recognized from the user utterance. FIG. 7 illustrates such a sample DATA grammar for names in a phone directory, and the semantic values for these names that could correspond to identifiers in the database storing the directory. The DATA grammar may be expressed as a CFG without probabilities, which denotes that each data item is equally likely, or, if desired, may be expressed as a probabilistic CFG. By using a flexible recognition CFG the developer need not define an entire application grammar and associated production rules such as shown in FIG. 5.

Figure 8:
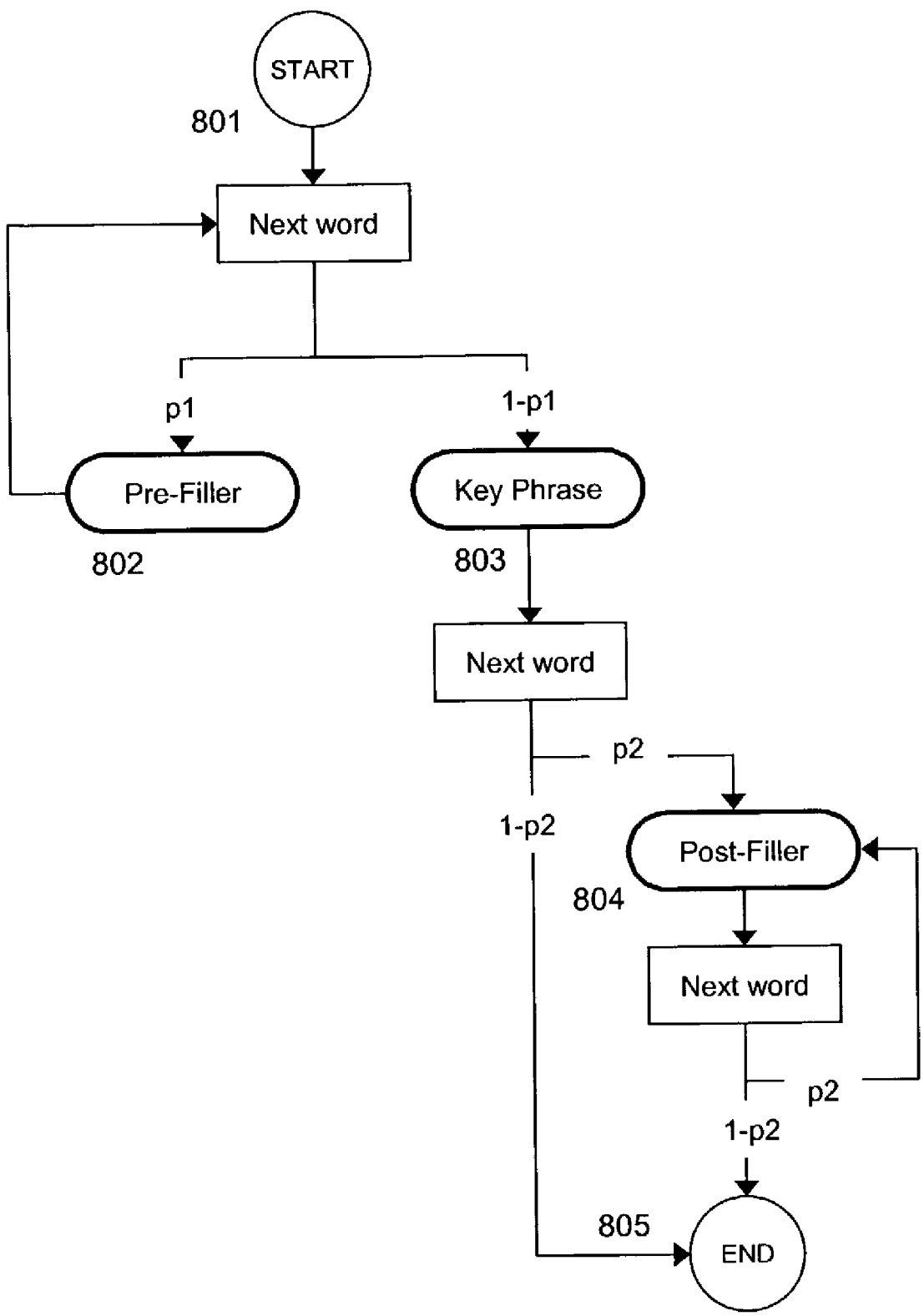
FIG. 8. is a finite state machine related to one embodiment of the present invention.

FIG. 8 shows a finite state machine related to the flexible recognition CFG in one embodiment of the invention. At the start of the user utterance, each word has a probability p1 of being part of the pre-filler phrase 802 and a probability (1−p1) of being the first word in the key phrase 803. Once the first word in the key phrase is matched, each successive word has a probability (1−p2) of being a continuation of the key phrase 803, and a probability p2 of being the first word in the post-filler phrase 804. Once the first word in the post-filler phrase 804 is matched, all the remaining words are considered part of this filler phrase until the end of the utterance is reached.

In one embodiment of the invention, the filler grammars PRE-FILLER and POST-FILLER can be defined by the repetition of zero or more of the filler words. A probability $p_i$ can be assigned to the likelihood of occurrence of each word $w_i$ in the filler phrase, so that the sum of these probabilities is 1 ($\Sigma p_i=1$). FIG. 9. shows the construction of the filler grammar PRE-FILLER in this embodiment. The grammar PRE-FILLER 900 can produce zero, one or more repetitions of the grammar FILLERWORD 902. The grammar FILLERWORD can produce any single filler word. In this embodiment of the invention, the probabilities p1 and p2 are specified so that the utterance by the user of a key phrase is more likely to match grammar DATA than the fillers PRE-FILLER or POST-FILLER. At the same time, the probabilities are preferably set so that a user uttered phrase that surrounds a key phrase (but is not part of the key phrase) is more likely to match one of the fillers PRE-FILLER or POST-FILLER rather than the grammar DATA.

In one embodiment of the invention, other steps may be taken to increase the likelihood of matching key phrases uttered by a user with the DATA grammar 602, and to reduce the likelihood of matching uttered key phrases with filler grammars PRE-FILLER 601 or POST-FILLER 603. For example, the voice application may encourage users to issue utterances (and key phrases) within a certain field or category, thus decreasing the chance of truly arbitrary user utterances. In one embodiment, this may occur via prompts issued by a voice application to the user. As will be appreciated by those of ordinary skill, such prompts need not restrict the user to uttering only key phrases specified by the DATA grammar 602; instead, consistent with one embodiment of the invention, the prompts are directed to provide a semi-constrained user response. By way of example, the user may be provided a prompt such as: "Who would you like to speak to?" Such a prompt is designed to elicit a user response including the name (key phrase) of a party to be connected, but still provides the user with some freedom when phrasing a response (e.g. "I'd like to talk to [NAME], "Please connect me to [NAME], etc.). Consistent with the invention, because the semi-constrained user response is likely to be within a category (e.g. names in a phone directory, and phrases associated with a request to talk to a person in a phone directory), probabilities p1 and p2 may be modified accordingly.

One of skill in the art will recognize that the probabilities p1 and p2 may, but need not, be equal. Moreover, the probabilities could be set for a specific voice application, or could be preset for a class of voice applications within the same domain. Furthermore, as previously mentioned, in one embodiment of the invention the probabilities can be adjusted based on system performance and user and system feedback to provide better recognition accuracy and performance. In another embodiment of the invention, the probabilities can also be adjusted, such as by using a history factor or a user profile that reflects previous utterances parsed by the recognition system, so that the recognition probabilities are tuned to improve performance for a specific user or set of users.

Figure 10:
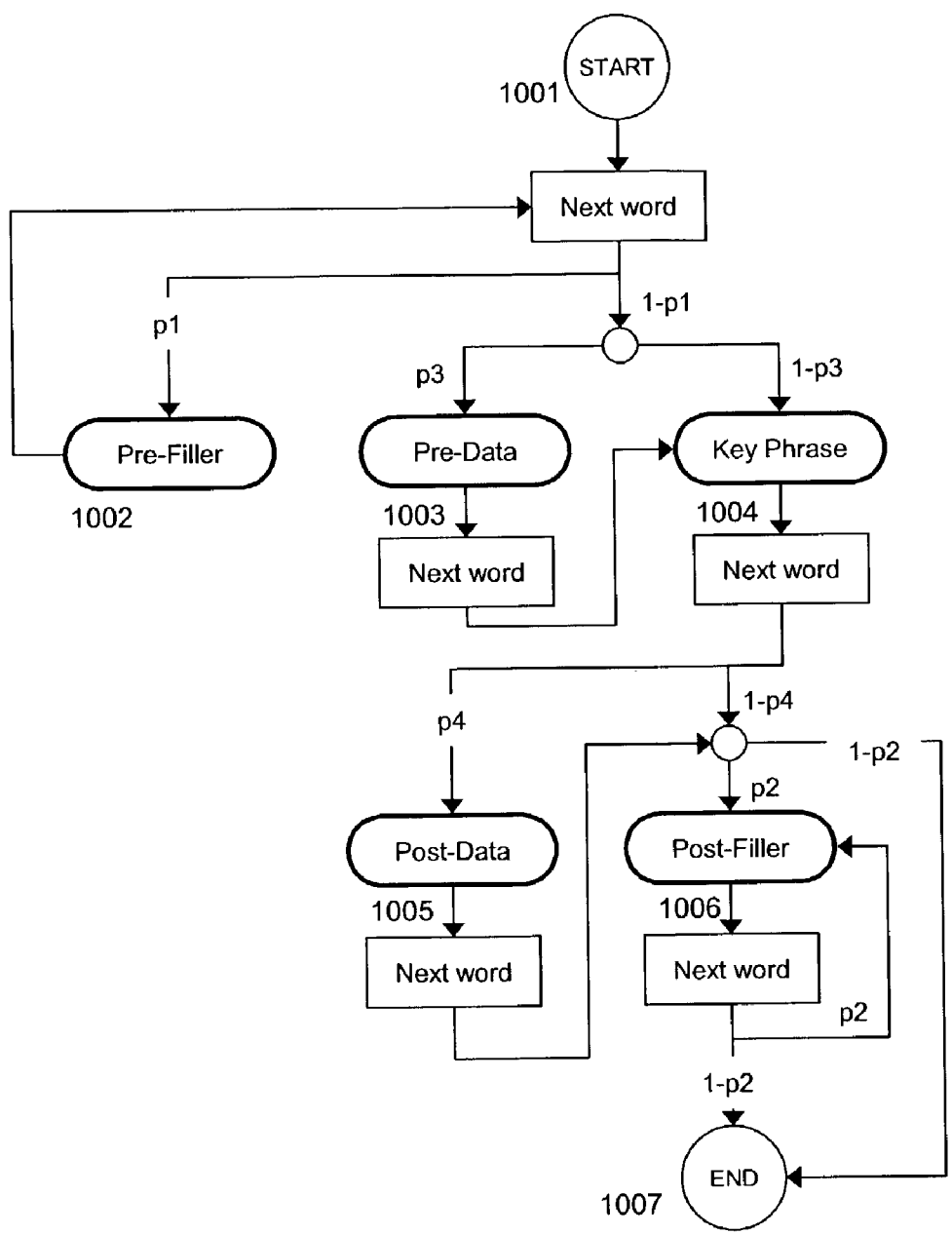
FIG. 10. is a finite state machine related to an embodiment of the present invention that includes trigger phrases.

FIG. 10 shows a finite state machine related to another embodiment of the invention. To further improve the accuracy of the system, a set of trigger phrases 1003 and 1005 may be defined. In one embodiment, the trigger phrases (1003, 1005) comprise words and phrases that signal the presence of a meaningful key phrase to be recognized. For example, often key phrases may be associated with trigger words and occur temporally close to the trigger words in the user utterance stream. In one embodiment, a pre-data trigger phrase 1003 is used to match a portion of the user utterance that is likely to precede the key phrase 1004, while a post-data trigger phrase 1005 matches an utterance that is likely to follow the key phrase 1004. For example, the pre-data trigger phrase 1003 for a flight reservation application that requests a departure airport from the caller may include phrases such as "from" or "out of". The post-data trigger phrase 1005 for a banking application that requests a dollar amount from the caller may include phrases such as "dollars" or "bucks". According to one aspect of the invention, identifying trigger words is used to enhance the ability to detect and recognize meaningful data in the user utterance. In one embodiment, a probability can be assigned to the likelihood of occurrence of each trigger phrase. In a preferred embodiment, the probabilities p3, p4 are assigned to the likelihood that a phrase surrounding the data item matches any of the pre-data or post-data trigger phrases, respectively, and the presence of trigger phrases may be used to help detect key phrases, such as, for example, by helping to identify the location of key phrases or adjusting probabilities associated with the grammars and production rules. For example, the presence of a trigger phrase (or particular trigger phrases) may be used to indicate the likely presence of a key phrase nearby in the user utterance stream, and the probability associated with a key phrase DATA grammar (or one or more particular key words or phrases) may be dynamically adjusted accordingly. FIG. 11 shows a grammar 1100 according to this embodiment of the invention, including the trigger grammars PRE-DATA and POST-DATA.

Another means of improving accuracy according to an embodiment of the invention is to define a confusion grammar, as shown in FIG. 12. In one embodiment, the confusion grammar (1204) comprises words and phrases commonly used in the domain (e.g. field or category) to which a voice application is directed (e.g. call attendant application), and is used to extract these words that are included in the user's response but which do not constitute part of the meaningful data. For example, the confusion grammar for a phone attendant application could include phrases such as "call", "connect", and "get me". According to one aspect of the invention, explicitly identifying and extracting confusion words (rather than relying on using the filler grammar to extract such words) reduces the chance that a confusion word will be misinterpreted as a key phrase. In one embodiment, the confusion words supplement the filler words used to construct the filler grammars, thus reducing the likelihood that an utterance fragment that is not a data value is misinterpreted as a data value in the most probable recognition result. In this embodiment, the probability p5 is assigned to the likelihood that a filler word is a confusion word, while the probability (1−p5) applies to the likelihood that a filler word was instead a regular filler word. In an embodiment of the invention, confusion grammars 1204 may be set according to the anticipated user utterance, such as based on the field or category of the expected user utterance. Thus, confusion words for one domain or category (e.g. a travel related voice application) may differ from confusion words in another domain or category (e.g. phone attendant voice application). Additionally, confusion phrases may be defined based on the key phrases to be recognized. As described above with reference to trigger grammars, probabilities associated with confusion grammars (and key phrase data grammars) may be set as predetermined values, or consistent with aspects of the present invention, may be adjusted dynamically based on, for example, recognized and/or matched portions of the user utterance, information related to the user or set of users (such as previous user interaction with the system, information stored in "cookies", etc.), etc.

The foregoing descriptions of specific embodiments of the invention have been presented for purposes of illustration and description. They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A computer implemented method, comprising:
receiving a speech signal;
extracting a sequence of acoustic feature vectors from the speech signal;
identifying a set of one or more words from the speech signal;
identifying a set of one or more phrases from the speech signal, the set of one or more phrases including a sequence of words, wherein the set of one or more phrases comprises key phrases and filler phrases;
assigning a first probability to a phrase of the one or more phrases, the first probability representing a likelihood that the sequence of acoustic feature vectors was produced by the phrase;
assigning a second probability to the phrase of the one or more phrases, the second probability representing a likelihood that the phrase would be received;
assigning a score to the phrase of the one or more phrases, the score calculated using the first probability and the second probability;
and
evaluating the speech signal against the set of phrases using the score.

2. The computer implemented method as recited in claim 1, further comprising providing a prompt to a user, wherein the prompt is designed to elicit a semi-constrained user response.

3. The computer implemented method as recited in claim 1, wherein defining the set of key phrases comprises specifying a key phrase grammar.

4. The computer implemented method as recited in claim 1, wherein the set of filler phrases covers at least a portion of the phonetic spectrum of phrases that can be spoken in a class of applications that share phonetic similarities.

5. The computer implemented method as recited in claim 4, wherein substantially all speech signals in said class of applications can be matched by a phrase in the set of filler phrases.

6. The computer implemented method as recited in claim 4, wherein defining the set of filler phrases comprises specifying a filler grammar.

7. The computer implemented method of claim 1, wherein a weighting factor assigned to a first key phrase can be adjusted to reduce the mis-recognition of the first key phrase as a second key phrase or a filler phrase.

8. The computer implemented method of claim 1, wherein a weighting factor assigned to the filler phrase can be adjusted to reduce the mis-recognition of the filler phrase as a key phrase.

9. The computer implemented method as recited in claim 1, further comprising:
  determining the presence of a trigger phrase; and
  using the presence of the trigger phrase to affect the recognition of a triggered key phrase.

10. The computer implemented method of claim 9, wherein the triggered key phrase is temporally close to the trigger phrase within the speech signal.

11. The computer implemented method as recited in claim 1, further comprising:
  identifying a set of one or more confusion phrases likely to be present in a speech signal; and
  determining the presence of a confusion phrase in the speech signal.

12. The computer implemented method of claim 11, wherein the confusion phrase is not a key phrase.

13. The computer implemented method of claim 11, further comprising disregarding a determined confusion phrase.

14. The computer implemented method of claim 11, wherein determining the presence of a confusion phrase includes assigning a weighting factor to a confusion phrase that affects the likelihood of matching a portion of the speech signal to the confusion phrase.

15. The computer implemented method as recited in claim 1, wherein weighting factors for filler phrases and key phrases arc not all the same.

16. The computer implemented method as recited in claim 1, wherein a first weighting factor for a first filler phrase is different than a second weighting factor for a second filler phrase.

17. The computer implemented method as recited in claim 1, wherein a first weighting factor for a first key phrase is different than a second weighting factor for a second key phrase.

18. The computer implemented method as recited in claim 1, wherein evaluating the speech signal further comprises:
  specifying a key phrase context-free grammar that produces the key phrases;
  specifying a filler context-free grammar that produces the filler phrases;
  specifying a sentence context-free grammar using at least the key phrase context-free grammar and the filler context-free grammar; and
  applying a speech recognition engine to the speech signal using the sentence context-free grammar.

19. The computer implemented method of claim 18, wherein specifying a sentence context-free grammar includes assigning at least one weighting factor to at least one production rule associated with the sentence context-free grammar.

20. The computer implemented method of claim 19, wherein assigning at least one weighting factor to at least one production rule further includes assigning weighting factors to a key phrase context-free grammar production rule and a filler context-free grammar production rule.

21. The computer implemented method of claim 19, wherein the weighting factors assigned to production rules are not all the same.

22. The computer implemented method of claim 18, wherein applying a speech recognition engine further comprises determining a match for one or more filler phrases from the speech signal.

23. The computer implemented method of claim 18, wherein applying a speech recognition engine further comprises disregarding a recognized filler phrase.

24. A computer implemented method as recited in claim 18, wherein the filler context free grammar produces a sequence of one or more constituent filler words.

25. The computer implemented method of claim 24, wherein the set of constituent filler words is predetermined.

26. The computer implemented method of claim 25, wherein the set of constituent filler words covers the spectrum of phoneme combinations that can be input in an intended class of applications.

27. The computer implemented method of claim 25, wherein the set of constituent filler words approximates the spectrum of phoneme combinations that can be input in an intended class of applications.

28. The computer implemented method of claim 27, wherein the set of constituent filler words contains less than the entire set of phonemes that can be input in the intended class of applications.

29. The computer implemented method of claim 18, wherein the sentence context-free grammar comprises at least one filler context-free grammar preceding the key phrase context-free grammar and at least one filler context-free grammar following the key phrase context-free grammar.

30. The computer implemented method as recited in claim 18, further comprising:
  specifying a first context-free grammar to produce pre-data trigger phrases;
  specifying a second context-free grammar to produce post-data trigger phrases;
  wherein specifying the sentence context-free grammar using at least the key phrase context-free grammar and the filler context-free grammar, optionally includes using the first context-free grammar and the second context-free grammar.

31. The computer implemented method of claim 30, wherein the sentence context-free grammar comprises a combination of a filler context-free grammar and the first context-free grammar preceding the key phrase context-free grammar, and a combination of a filler context-free grammar and the second context-free grammar following the key phrase context-free grammar.

32. The computer implemented method as recited in claim 18, further comprising:
  specifying a confusion context-free grammar;
  specifying a sentence context-free grammar using at least the key phrase context-free grammar and the filler context-free grammar, and optionally the confusion context-free grammar.

33. The computer implemented method of claim 32, wherein the sentence context-free grammar comprises a combination of a filler context-free grammar and a confusion context-free grammar preceding the key phrase context-free grammar, and a combination of a filler context-free grammar and a confusion context-free grammar following the key phrase context-free grammar.

34. A computer implemented method, comprising:
receiving a speech signal;
extracting a sequence of acoustic feature vectors from the speech signal;
identifying a set of one or more words from the speech signal;
identifying a set of one or more phrases from the speech signal, the set of one or more phrases including a sequence of words, wherein the set of one or more phrases comprises key phrases and filler phrases;
specifying a key phrase context-free grammar that produces the key phrases;
specifying a filler context-free grammar that produces the filler phrases;
assigning a first probability to a phrase of the one or more phrases, the first probability representing a likelihood that the sequence of acoustic feature vectors was produced by the phrase;
assigning a second probability to the phrase of the one or more phrases, the second probability representing a likelihood of receiving the phrase;
assigning a score to the phrase of the one or more phrases, the score calculated using the first probability and the second probability;
defining a sentence context-free grammar using the key phrase context-free grammar, the filler context-free grammars, the scores; and
evaluating the speech signal against the sentence context-free grammar to extract a key phrase from the speech signal.

* * * * *